US009741147B2

(12) United States Patent
Allen et al.

(10) Patent No.: US 9,741,147 B2
(45) Date of Patent: Aug. 22, 2017

(54) SYSTEM AND METHOD TO MODIFY AVATAR CHARACTERISTICS BASED ON INFERRED CONDITIONS

(75) Inventors: Sheila E. Allen, Peekskill, NY (US); Gregory J. Boss, American Fork, UT (US); Peter G. Finn, Ontario (CA); Rick A. Hamilton, II, Charlottesville, VA (US); Clifford A. Pickover, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 849 days.

(21) Appl. No.: 12/333,586

(22) Filed: Dec. 12, 2008

(65) Prior Publication Data

US 2010/0153868 A1 Jun. 17, 2010

(51) Int. Cl.
*H04N 7/15* (2006.01)
*G06N 3/00* (2006.01)
*G06F 9/44* (2006.01)
*G06Q 50/00* (2012.01)
*G06T 13/40* (2011.01)

(52) U.S. Cl.
CPC ...... *G06T 13/40* (2013.01); *A63F 2300/1012* (2013.01); *A63F 2300/5553* (2013.01); *A63F 2300/6045* (2013.01); *A63F 2300/6607* (2013.01); *G06F 9/4443* (2013.01); *G06N 3/006* (2013.01); *G06Q 50/01* (2013.01); *H04N 7/157* (2013.01)

(58) Field of Classification Search
CPC ...... H04N 7/157; G06N 3/006; G06F 9/4443; A63F 2300/5553; G06Q 50/01
USPC ............... 715/706, 733, 734, 757, 758, 764; 709/201, 217, 219, 245; 345/635–638, 345/949, 950
See application file for complete search history.

(56) References Cited

U.S. PATENT DOCUMENTS

| | | | |
|---|---|---|---|
| 5,880,731 A | 3/1999 | Liles et al. | |
| 5,884,029 A * | 3/1999 | Brush et al. | 709/202 |
| 5,982,390 A | 11/1999 | Stoneking et al. | |
| 5,991,735 A | 11/1999 | Gerace | |
| 6,236,983 B1 * | 5/2001 | Hofmann et al. | 706/47 |
| 6,249,720 B1 * | 6/2001 | Kubota | B60R 16/0232 340/990 |
| 6,329,986 B1 * | 12/2001 | Cheng | 345/419 |
| 6,405,159 B2 * | 6/2002 | Bushey et al. | 703/13 |
| 6,545,682 B1 * | 4/2003 | Ventrella et al. | 345/473 |
| 7,065,711 B2 | 6/2006 | Hata et al. | |
| 7,073,129 B1 * | 7/2006 | Robarts et al. | 715/740 |
| 7,124,372 B2 | 10/2006 | Brin | |

(Continued)

*Primary Examiner* — Eric J Bycer
(74) *Attorney, Agent, or Firm* — Lisa Ulrich; Andrew M. Calderon; Roberts Mlotkowski Safran Cole & Calderon, P.C.

(57) ABSTRACT

A system and method to modify avatar characteristics and, in particular, to modify avatar characteristics based on inferred conditions. The system comprises a collection engine configured to collect one or more inputs and at least one rule set. The system also comprises an emotion engine configured to accept the one or more inputs and operate on the at least one rule set by comparing the one or more inputs to the at least one rule set, the emotion engine configured to modify at least one characteristic of a user participating in a virtual universe when the comparing produces a match.

26 Claims, 4 Drawing Sheets

```
                                   230
                     Rule Set      /
           ┌─────────────────────────────────┐
           │ Rule Name:  Rain                │
           │ Rule Number:  12                │
           │ Condition Test:  Is it raining  │
           │ Condition Priority:  High       │
           │                                 │
           │ Avatar Characteristic 1:  Sadness│
           │ Characteristic 1 Action:  Crying │
           │ Characteristic 1 Duration:  2 minutes │
           │                                 │
           │ Avatar Characteristic 2:  Sadness│
           │ Characteristic 2 Action:  Frown  │
           │ Characteristic 2 Duration:  6 minutes │
           │                                 │
           │ ...                             │
           │                                 │
           │ Avatar Characteristic n: ...    │
           │ Characteristic n Action: ...    │
           │ Characteristic n Duration: ...  │
           └─────────────────────────────────┘
```

(56) References Cited

U.S. PATENT DOCUMENTS

| | | | |
|---|---|---|---|
| 7,908,554 B1* | 3/2011 | Blattner | G06Q 10/107 715/706 |
| 2004/0075677 A1 | 4/2004 | Loyall et al. | |
| 2004/0179038 A1* | 9/2004 | Blattner et al. | 345/751 |
| 2004/0261013 A1 | 12/2004 | Wynn et al. | |
| 2005/0101845 A1 | 5/2005 | Nihtila | |
| 2005/0143138 A1 | 6/2005 | Lee et al. | |
| 2005/0216529 A1 | 9/2005 | Ashtekar et al. | |
| 2005/0223328 A1 | 10/2005 | Ashtekar et al. | |
| 2006/0052998 A1* | 3/2006 | Michelman | 703/22 |
| 2006/0184355 A1 | 8/2006 | Ballin et al. | |
| 2006/0224546 A1* | 10/2006 | Ballin et al. | 706/62 |
| 2007/0112762 A1 | 5/2007 | Brubaker | |
| 2007/0218987 A1 | 9/2007 | Van Luchene et al. | |
| 2007/0220423 A1* | 9/2007 | Charbonneau et al. | 715/517 |
| 2007/0239826 A1 | 10/2007 | Ducheneaut et al. | |
| 2007/0240119 A1 | 10/2007 | Ducheneaut et al. | |
| 2008/0001951 A1 | 1/2008 | Marks et al. | |
| 2008/0082613 A1* | 4/2008 | Szeto | H04L 51/043 709/206 |
| 2008/0269958 A1* | 10/2008 | Filev | B60W 50/10 701/1 |
| 2009/0002178 A1* | 1/2009 | Guday | A61B 5/0002 340/573.1 |
| 2009/0140864 A1* | 6/2009 | Aaron | G06Q 30/02 340/573.1 |
| 2009/0300525 A1* | 12/2009 | Jolliff | H04M 1/72544 715/764 |
| 2010/0011388 A1* | 1/2010 | Bull | H04N 21/41407 725/9 |
| 2010/0097395 A1* | 4/2010 | Chang | A63F 13/12 345/619 |
| 2010/0146407 A1* | 6/2010 | Bokor | G06F 3/011 715/757 |

\* cited by examiner

| Characteristic | Prompt | Action |
|---|---|---|
| Bored | "Would you like to see a movie..." | Play movie |
| Sick | "Would you like to see a doctor..." | Teleport to virtual hospital |
| Upset | "Do you want to hear music..." | Play music |
| Sad | "We have detected you are sad" | None |
| ... | ... | ... |
| Sick | None | Increase brightness of colors in room |

SYSTEM AND METHOD TO MODIFY AVATAR CHARACTERISTICS BASED ON INFERRED CONDITIONS

FIELD OF THE INVENTION

The invention generally relates to a system and method to modify avatar characteristics and, in particular, to modify avatar characteristics based on inferred conditions.

BACKGROUND OF THE INVENTION

A virtual universe (VU) is an interactive simulated environment accessed by multiple users through an online interface. Users inhabit and interact in the VU via avatars, which are a user's representation of himself or herself. These representations can be in the form of a three-dimensional model, a two-dimensional icon, a text construct, a user screen name, etc. Although there are many different types of VUs, there are several features many VUs generally have in common. These features include, for example,

- Shared Space: the VU allows many users to participate at once;
- Graphical User Interface: the VU depicts space visually, ranging in style from 2D "cartoon" imagery to more immersive 3D environments;
- Immediacy: interaction takes place in real time;
- Interactivity: the VU allows users to alter, develop, build, or submit customized content;
- Persistence: the VU's existence continues regardless of whether individual users are logged in; and
- Socialization/Community: the VU allows and encourages the formation of social groups such as teams, guilds, clubs, cliques, housemates, neighborhoods, etc.

Visual clues as to a person's emotions, state of mind, state of health, etc., are important in helping people fully understand the context of a communication, both in the real world and in a VU. For example, direct and indirect clues, such as facial expressions, subtle body movements and postures, eye jitter, clothing, gestures, and even changes in skin coloration due to emotion, can be used to determine whether a user is nervous, tired, annoyed, sick, etc. In the real world, these types of subtle queues assist communication, facilitate empathy, and shape our social and business interactions. However, these subtleties are not conveniently reflected in virtual universes.

For example, if a user wanted to smile in a VU, the user would have to manually issue a command to make the user's avatar smile. This command would have to be issued over and over to denote that the avatar was happy. Understandably, this detracts from the immersive characteristic of a VU, is time consuming, and distracting. Moreover, since the command lasts only for a very short period of time, avatars may not pick up on the visual clue and may misinterpret textual and/or audio communications that would have otherwise been obvious if the users were interacting face to face in the real world.

SUMMARY OF THE INVENTION

In a first aspect of the invention, a system comprises a collection engine configured to collect one or more inputs and at least one rule set. The system also comprises an emotion engine configured to accept the one or more inputs and operate on the at least one rule set by comparing the one or more inputs to the at least one rule set, the emotion engine configured to modify at least one characteristic of a user participating in a virtual universe when the comparing produces a match.

In another aspect of the invention, the method comprises ascertaining one or more inputs and comparing the one or more inputs to at least one rule set via an emotion engine, wherein the at least one rule set comprises at least one characteristic. The method also comprises applying a priority to the at least one characteristic and modifying the at least one characteristic based on the priority.

In another aspect of the invention, a computer program product comprising a computer usable medium having readable program code embodied in the medium is provided. The computer program product includes at least one component operable to obtain one or more inputs and compare the one or more inputs to at least one rule set to determine the applicability of the at least one rule set, wherein the comparison is performed by an emotion engine. The computer program product further including at least one component operable to modify at least one characteristic based on the comparison and display the modified at least one characteristic in a virtual universe.

In yet another aspect of the invention, a method for deploying an application for modifying audio communications, comprises a computer infrastructure operable to: compare the one or more inputs to at least one rule set; modify at least one avatar characteristic based on the comparison; and display the modified at least one avatar characteristic in a virtual universe.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF THE INVENTION

The invention is directed to a system and method to modify avatar characteristics and, in particular, to modify avatar characteristics based on inferred conditions. More specifically, the present invention monitors and collects information about an avatar. The collected information may relate to an avatar's environmental conditions, financial transactions, and/or conversational analysis, etc. In embodiments, the user may prevent certain information from being collected and/or from being used to infer conditions.

Collected information can be sent to an engine, which can query additional sources of information, if needed. The engine is also operable to compare the collected and/or queried information to one or more avatar rule sets. Each rule set may comprise any number of characteristics that may be modified based on the collected and/or queried information. Characteristics may be associated with any one or more of an avatar, landscape, map, and building. For example, characteristics may be portrayed on a map of a virtual universe.

Exemplary avatar characteristics may include hair and skin color, height, weight, build, and/or emotion, etc. Additional characteristics may include facial expressions (smiling, frowning, thinking, eyes opened/closed, etc), tears, a nasal or horse voice, clothing, stature (sitting or standing straight or slouched), etc. One or more characteristics may also extend to body movements such as swinging arms, folding arms, jumping, etc. If a match occurs between the collected information and the avatar rule set, the characteristics associated with the matching rule set can be modified accordingly. The modification may be performed, e.g., by allowing the engine to interface with an Application Program Interface (API) to control the one or more applicable avatar characteristics.

In embodiments, the avatar may be provided with feedback before and/or after the modification is performed. The feedback may be used to, e.g., inform the user of a detected mood and/or attempt to alter the user's mood. In embodiments, the user may also be allowed to prevent one or more avatar characteristics from being modified.

The steps of the present invention can be repeated indefinitely, thereby allowing new inputs to be continuously compared to rule sets and avatar characteristics to be continually modified through the API. Thus, the present invention allows conditions to be inferred and avatar characteristics to be modified based on the inferred conditions.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

an electrical connection having one or more wires,
a portable computer diskette,
a hard disk,
a random access memory (RAM),
a read-only memory (ROM),
an erasable programmable read-only memory (EPROM or Flash memory),
an optical fiber,
a portable compact disc read-only memory (CDROM),
an optical storage device, and/or
a transmission media such as those supporting the Internet or an intranet, or a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

Figure 1:
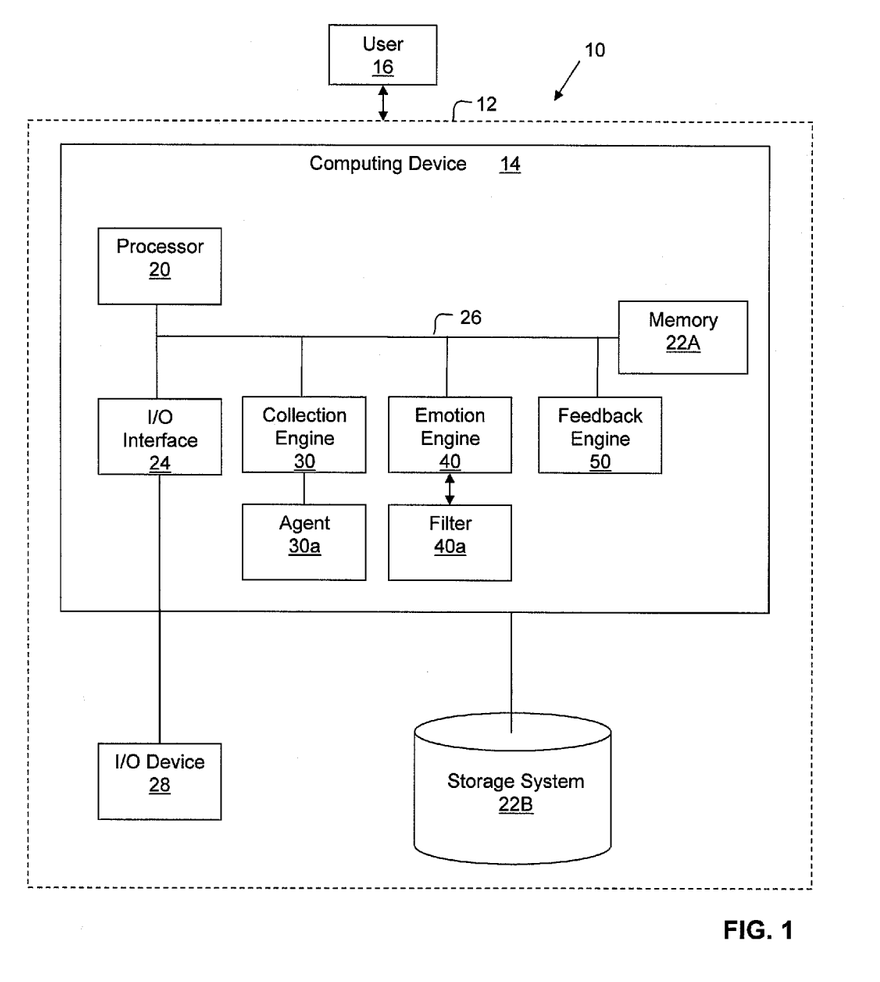
FIG. 1 shows an illustrative environment for implementing the steps in accordance with the invention.

FIG. 1 shows an illustrative environment 10 for managing the processes in accordance with the invention. To this extent, the environment 10 includes a server 12 that can perform the processes described herein. In particular, the server 12 includes a computing device 14, which may be in the form of a VU server system. The computing device 14 comprises a Collection Engine 30, which is configured to collect one or more inputs from various sources and/or agents that monitor for environmental conditions, financial transactions, conversational analysis, etc. The various sources and/or agents are represented collectively as agent 30a and may include a text analysis agent, financial transaction agent, medical and/or prescription agent, environmental sensor, calendar agent, profile information, physiological agent, biometric agent, etc.

The computing device 14 also comprises an Emotion Engine 30, which may be installed and/or collocated on a simulation server or client code. In embodiments, the Emotion Engine 40 may also be implemented as a web service. The Emotion Engine 40 is configured to operate on one or more rule sets, which may be defined by a user 16 when setting up an avatar profile. The Emotion Engine 40 is also configured to interface with an API to control one or more avatar characteristics such as hair and skin color, height, weight, build, emotions, facial expressions (smiling, frowning, thinking, eyes opened/closed, etc), tears, a nasal or horse voice, clothing, stature (sitting or standing straight or slouched), etc. Characteristics may also extend to body movements such as swinging arms, folding arms, jumping, etc. A filter 40a may be used to block information from being collected by the Collection Engine 30 and/or the Emotion Engine 40. Moreover, in embodiments, the filter 40a may block one or more inputs from being sent to the Emotion Engine 40.

The computing device 14 also comprises a Feedback Engine 50, which is configured to provide feedback to a user before or after modifying the one or more avatar characteristics. In embodiments, the feedback may be structured to help alter a user's mood.

The computing device 14 also includes a processor 20, the memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution.

The computing device 14 is in further communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be keyboards, displays, pointing devices, microphones, headsets, etc.

In general, the processor 20 executes computer program code, which is stored in the memory 22A and/or storage system 22B. While executing computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Exemplary Implementation of the System

Figure 2:
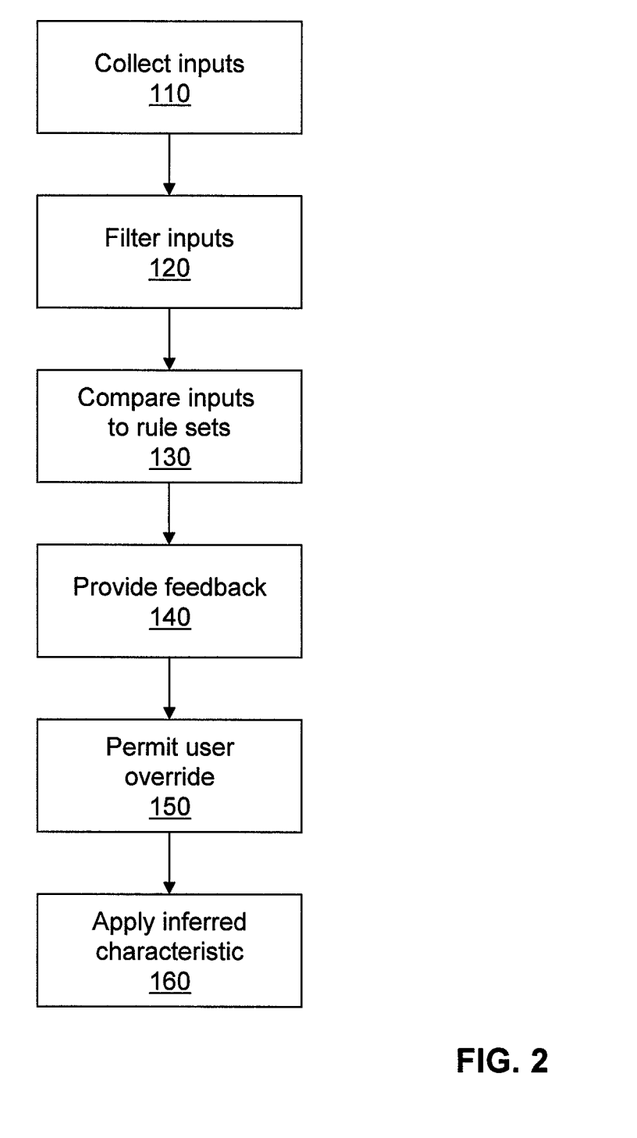
FIG. 2 shows a flow chart of an exemplary process in accordance with aspects of the invention.

FIG. 2 is a flow diagram implementing steps of the invention which may be implemented in the environment of FIG. 1. FIG. 2 may equally represent a high-level block diagram of the invention. The steps of FIG. 2 may be implemented and executed from either a server, in a client server relationship, or they may run on a user workstation with operative information conveyed to the user workstation. Additionally, the invention can take the form of an entirely hardware embodiment, an entirely software embodiment or an embodiment containing both hardware and software elements.

In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIG. 1, as should be understood and capable of implementation by those of skill in the art. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Referring to FIG. 2, the present invention is configured to collect information that has been obtained from agents or collectors, at step 110. More specifically, a Collection Engine 30 may utilize agents or collectors (shown in FIG. 1 as agent 30a) to monitor and collect information about an avatar. In embodiments, information available in a consumable format may be collected from any source over which the owner has control. Exemplary agents for collecting the information may include a text analysis agent, financial transaction agent, medical and/or prescription agent, environmental sensor, calendar agent, profile information, physiological agent, biometric agent, etc. One or more of these agents may be deployed to obtain information from, e.g., an electronic calendar, outdoor temperature or rain sensors, Instant Messaging and/or email systems, web browsers, etc.

For example, a text analysis agent may utilize a dictionary frequency table and predetermined thresholds to analyze text from an instant message (IM), email, and/or website, etc. The text analysis agent may also be used to, e.g., analyze a user's text and/or detect one or more predefined words or phrases. For example, the text analysis agent may be used to determine how frequently a user uses the word "happy" and send the result to the Emotion Engine.

A financial transaction agent may be used to obtain information about a user by querying financial company records for recent transactions that may be used to infer a users state of mind or health. For example, the financial transaction agent may detect that user is a buying a book, paying for a plane ticket, or purchasing a piece of health related software, etc. One or more of these detected events may be sent to the Emotion Engine as an input and used to determine one or more possible states of mind, emotions, etc.

Additional inputs may also be obtained by a collector agent. For example, a medical and/or prescription agent may be used to monitor for any prescriptions ordered, filled, or paid for by a user. Embodiments may also implement a physiological agent to sense one or more physiological states, such as galvanic skin response, blood pressure, etc. Additionally, a biometric agent may be used to monitored a user's eye blink rate, eye jitter, pupil dilation, postures, shakiness, and/or breathing rate, etc.

Further inputs may be obtained from a profile information agent, which may be used to monitor a users profile and detect any changes made to the users profile. Additional inputs may also be obtained from a calendar agent, which can ascertain information on birthdays, vacations, business trips, destinations, etc. Environmental sensors may also be used to detect and/or collect weather conditions such as temperature, precipitation, seismic activity, etc. Additional agents are also contemplated by the present invention such as, for example, a cell phone agent, which can be used to identify tower locations and/or published GPS coordinates, etc. In embodiments, the information collected by the Collection Engine may be sent to an Emotion Engine.

In addition to the information from the Collection Engine, the Emotion Engine may also obtain information by querying existing sources over which the user may not have control. The queries can be used to reach any information that is available in a consumable format. For example, queries may be used to obtain information on a user's financial transactions at a bank or credit card company. Queries may also be used to, e.g., obtain information from a public web service, such as a weather service.

Although the present invention allows a variety of information to be collected, it should be understood that the user can keep information from being collected by the Collection Engine and/or the Emotion Engine. In embodiments, this may be accomplished using a filter, such as a flexible filter or privacy shield, at step 120. The filtering may be performed by the Collection Engine, the Emotion Engine, and/or a designated filtering engine. Moreover, the filtering may be performed after or while information is collected by the Collection Engine and/or Emotion Engine.

Parameters relating to the type of information that can be monitored, collected, and/or filtered may be specified by the user, administrator, VU, company, physician, family member, and/or service provider, etc. A policy table or other construct may be created to maintain the specified parameters. For example, a policy table may include a parameter that filters out all information on purchases over a certain amount. The policy table may also include a parameter to filter out all medical visits for a certain period of time. Moreover, the policy table may also include parameters that directly control an avatar's appearance and/or characteristics. In embodiments, further parameters may be defined that control weather, lighting, ambient sounds, colors and other visual characteristics of rooms, and/or the functioning of devices (e.g. virtual cars, door bells, pets, and virtual financial advisors, and helper avatars), etc. These parameters may be used to, e.g., prevent the colors and/or arrangement of objects within a room from changing. Information that is filtered is not used to infer conditions about an avatar's characteristics.

Information that has been collected by the Collection Engine and/or obtained by the Emotion Engine, which has not been filtered, can be compared against one or more rule sets, at step 130. Rule sets may be defined using default values and/or defined by a user during a profile setup. Rule sets may comprise one or more weighted or prioritized entries, which match conditions with avatar characteristics. The applicability of a condition may be determined based on the collected and/or queried information. If the condition is met, the one or more avatar characteristics associated with the condition may be activated and/or modified. For example, collected and/or queried information may be used to determine if the condition "Is it raining" is met. If the condition is met, characteristics associated with the condition may be modified and/or applied to the user's avatar. Thus, if a sad characteristic is associated with the condition "Is it raining" being met, the inference that it is raining will make the avatar appear sad. However, in embodiments, the inference that it is not raining may also affect an avatar's characteristic, for example, by making the avatar appear happy.

In embodiments, feedback may be provided to a user before or after modifying the one or more avatar characteristics, at step 140. The feedback is designed to help alter a user's mood. The type of feedback that is provided to the user may be defined in a policy table or alternative construct. The policy table may be predefined with default values, however, in embodiments, the policy table may be modified by the user with the user's own personal preferences. Once the policy table is defined, it can be used to detect the user's mood based on the inferred conditions and provide feedback to the user in an attempt to alter the user's mood. Feedback may be performed by the Feedback Engine or the Emotion Engine and may be presented to a user visually, audibly, and/or textually.

Feedback may be performed by the Emotion Engine or a feedback engine and may be presented to a user visually, audibly, and/or textually. For example, a policy table can include any number of suggestions that may be implemented when certain conditions are met and/or moods are detected, such as, e.g., changing the virtual decor in a virtual building, playing specific music or a movie, providing a user with a type of reading material, etc., when certain moods are detected. In embodiments, the feedback may also be used to inform the user as to what emotional state has been detected. This may be performed, e.g., by providing the user with a numerical value, a visual color, etc., which designates a users mood according to a predefined scale. For example, a value of 3.1 may indicate the user is in a melancholy mood, whereas, a value of 7.9 may indicate the user is in a cheerful mood. Similarly, a black color may indicate the user is depressed, whereas, a yellow color may indicate the user is happy.

A user may be permitted to override an inferred condition before one or more avatar characteristics are modified, at step 150. This permits a user to keep one or more characteristics from being applied. For example, a user may decide to override a modification, e.g., in certain social settings and/or during certain occasions when emotions are not warranted and/or appropriate.

In embodiments, the user may automatically override certain characteristics and/or override characteristics on a one by one or group basis. For example, if the Emotion Engine infers that a characteristic should be modified, the proposed modification and characteristic to be modified may be presented to the user for approval. The user may then decide to accept or reject the alteration. In embodiments users may be presented with the option to override a modification each time a modification is suggested, override one or more modifications occurring during a period of time, etc. Embodiments may also determine the user's context and automatically override certain modifications. For example, the Emotion Engine may determine that the user is at work speaking with a client and may override a modification that would make the avatar cry. While the override process may be performed as a separate step, those skilled in the art should realize the override process may be implemented as part of a filter, as discussed above.

If a modification has not been overridden, the modification may be applied to an avatar characteristic, at step 160. The modification may be performed using the Emotion Engine, which is configured to interface with the avatar through API's to control one or more characteristics. During the interfacing, one or more characteristics may be mapped onto existing avatar characteristics, thereby modifying the avatar's characteristics. In embodiments, the mapping may be visible to all avatars and/or a subset of avatars. The process of mapping characteristics, which are rendered to others, may be performed by the VU, client computer, or other computer device. For example, in embodiments, the VU may send applicable characteristics to be modified to the client computer, which can perform the appropriate rendering. After or while the mapping is performed, the Collection Engine and/or the Emotion Engine may continue to collect and/or obtain information and/or conditions, which may be used to modify one or more avatar characteristics. Thus, the steps in FIG. 2 are designed to be cyclical so as to allow conditions to be continually inferred and used to modify one or more avatar characteristics.

Rule Set

Figure 3:
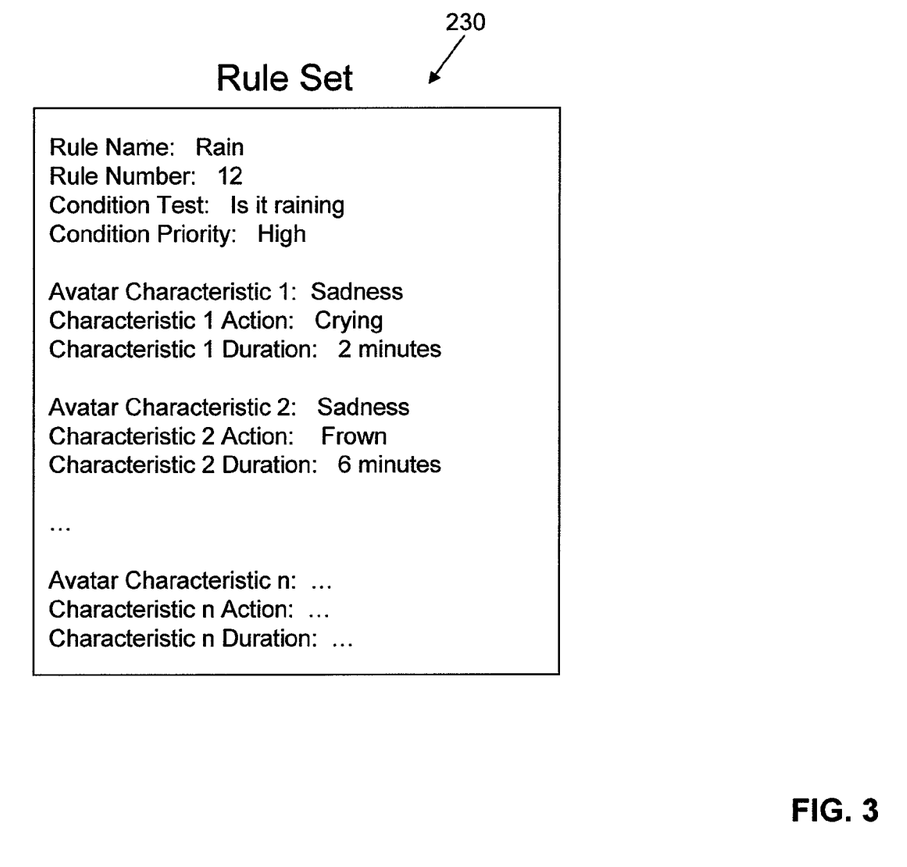
FIG. 3 shows an exemplary rule set in accordance with aspects of the invention.

FIG. 3 illustrates an exemplary rule set according to embodiments of the present invention. While only one rule set is illustrated, it should be understood by those skilled in the art that multiple rule sets may exist for each avatar. Each rule 230 may include a rule name, rule number, condition test, condition priority or weight, and/or avatar characteristic, etc. Each avatar characteristic may be related to a characteristic action and/or a characteristic duration. The rule sets 230 may be defined using default values, which may be altered by the user, administrator, VU, service provider, etc. However, in embodiments, the rule set 230 may be independently created and defined by a user, administrator, VU, etc.

Information obtained from the Collection Engine and/or Emotion Engine may be used to determine whether one or more conditions associated with one or more rule sets 230 are met. If a condition is met, the characteristics associated with the condition may be applied to an avatar. For example, a Collection Engine may obtain information via an environmental agent that it is raining where the user lives. Additionally, a calendar agent may determine that it is Friday. Both of these pieces of information can be sent by the Collection Engine to the Emotion Engine as inputs. The Emotion Engine can operate on an avatar's rule set 230 by comparing the "Rainy" and "Friday" inputs to one or more of the avatar's rule sets 230. In embodiments, the comparison may be performed by comparing inputs to conditions within the rule set 230. Based on the comparison, a determination may be made as to what rule sets are applicable.

For example, as illustrated in FIG. 3, the input "Rain" meets the condition "Is it raining", therefore, rule set 230 is applicable. Since rule set 230 is applicable, the characteristics associated with the rule set may be used to modify the avatar to, e.g., appear sad through actions such as crying or frowning. The applicable characteristic may be applied permanently or temporarily for a predetermined amount of time. Thus, for example, an avatar may frown and/or start to cry for a duration of two minutes when it starts to rain in the user's geographical location. The avatar may continue to frown for six minutes after the rain starts.

A priority or weight of the characteristics may be defined in the rule set 230. This may be performed using a scale, such as a numerical scale or a scale indicating a high, medium, or low priority. The higher the priority or weight, the more important the rule. Understandably, the priority or weight, characteristics associated with a rule set, as well as the durations and actions associated with the characteristics may be altered by the user, an administrator, and/or a VU.

The priority or weight of a rule is particularly important when one or more inputs are entered into the Emotion Engine. For example, an input of "Rain" may result in a sadness emotion whereas an input of "Friday" may result in a happy emotion. Accordingly, the weights associated with each of the applicable rule sets can be analyzed to determine which is more important. Thus, for example, if "Rain" has a high priority and "Friday" has a medium priority, the emotion associated with "Rain" may completely overcome the emotion associated with the "Friday" emotion, thereby resulting in a sad avatar. However, in embodiments, emotions may be balanced together with more weight associated with the higher priority rule set, such that the avatar would be moderately sad as a result of the "Rain" input.

Any number of rule sets 230 may exist at any given time and many rule sets may be associated with the same input. In embodiments, there may be contradictory avatar characteristics within rule sets that are associated with the same input. In such embodiments, preferences may be given to rule sets defined by the user and/or an administrator. Additionally, preferences may be given to, e.g., the most recently added and/or modified rule sets.

Feedback

Figure 4:
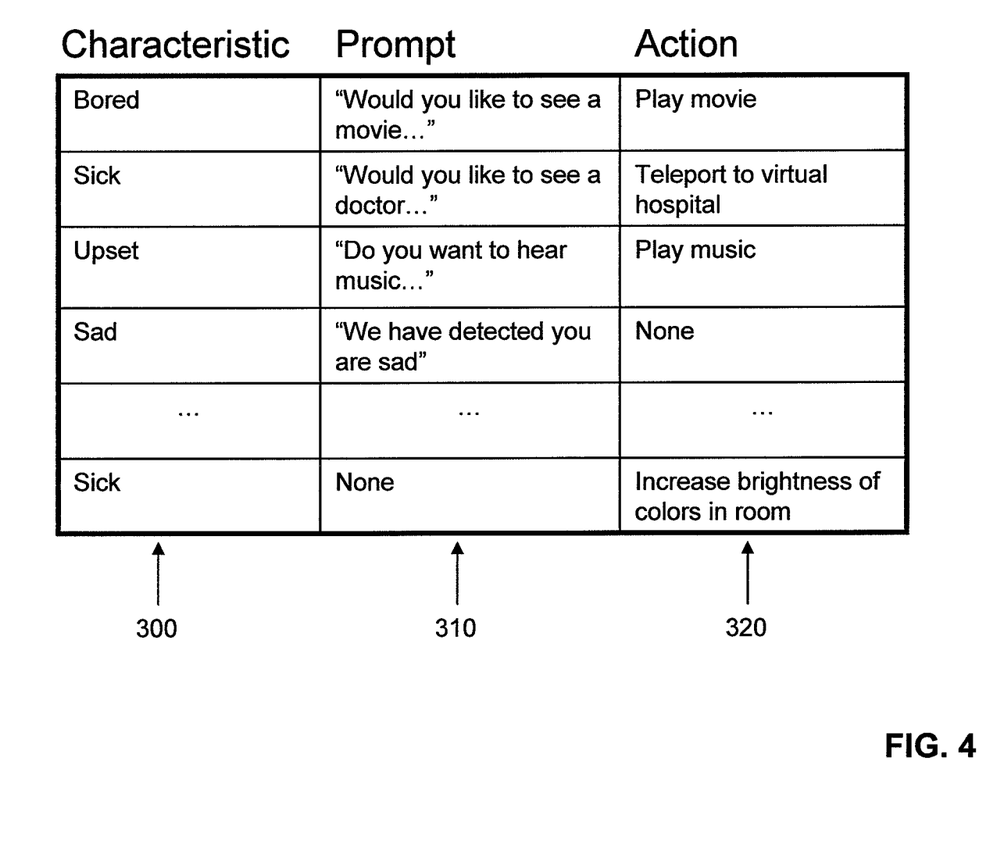
FIG. 4 shows a policy table in accordance with aspects of the invention.

Feedback may be provided to the user via the Emotion Engine or a feedback engine in order to improve a user's mood, which may be determined from one or more inferred conditions. As described above, the type of feedback provided to a user can be defined in a policy table, which is illustrated in FIG. 4. More specifically, FIG. 4 includes a policy table having one or more moods, as represented in column 300. The policy table may include a prompt, which is illustrated in column 310. The prompt may be used to notify the user of the detected mood. In embodiments, the prompt may also be used to ask the user if he/she would like an action to occur. One or more types of actions may be indicated, e.g., in column 320.

For example, a determination may be made that a user is sick by matching one or more inputs to a rule set. This determination may lead to a prompt being sent to the user asking whether the user wants to go to see a doctor. If the user wants to see a doctor, the user may be teleported to a virtual hospital to see a doctor. In embodiments, if an angry or upset mood is detected, the user may be asked whether he/she would like to hear easy listening music. Similarly, if a depressed mood is detected, the user may be asked whether he/she would like to hear upbeat music or watch a funny movie.

In another illustrative example, a notification may be sent to a user indicating that the user is sad. In yet another example, the colors in a room may be brightened if the avatar is sick, angry, sad, etc. This action, as well as any number of additional actions, may be performed with or without prompting the user based on one or more policies defined in a feedback policy table.

Moreover, in embodiments, an aggregate mood for a group of avatars may be computed. For example, an aggregate mood may be computed for a group of avatars located on an island. The aggregate mood may be detected by one or more of surveys, typing speed, use of curse words in communications, number of sick days taken during a specified duration, or any number of additional inputs described above. The aggregated mood may be represented to one or more users via a visual or numerical scale. For example, a dark blue hue may indicate a poor mood on the island. Based on the aggregated mood, a number of environmental factors, such as the weather, can be changed to positively or negatively affect the mood. Thus, the weather on an island having avatar's with an aggregate bad mood may be altered to provide sun and bright skies in order to improve the aggregate mood.

In embodiments, any number of states such as emotional, financial, and/or health, etc., may be aggregated and reflected in the characteristics of a building or landscape, which are associated with a plurality of avatars. For example, if 50 avatars are on an island or in a building, and if their average real-world or virtual-world income is above a threshold, this may be reflected in attributes in the virtual world. Similarly, if the avatars are judged to have an average emotional state, this may also be reflected in the depiction of the associated landscape or building. Such depictions may also reflect states over a period of time, for example, the current state or the state over the past month.

Additional Embodiments

While the illustrated examples are directed to the modification of an avatar's emotional characteristics, it should be understood that additional avatar characteristics may be modified to show any number of conditions that would otherwise be obvious to someone in real life. For example, an avatar could be changed to wear a birthday hat if a calendar agent detected a family member's birthday celebration was occurring. Likewise, a business person's avatar could be made to appear tired if the user's calendar entry or computer's IP address denoted a change in location, such as a flight of past two time zones. Additional embodiments may make the avatar appear to have a cold if a financial transaction was monitored which showed that cold medicine was purchased in the last 24 hours. Moreover, the avatar's clothing, hair style, etc., can be dependent on the user's detected emotional state. For example, an avatar with a large amount of virtual or real money may have physical characteristics that make the avatar appear more affluent.

Moreover, in embodiments, the transmission of biometric or related user attributes into a virtual universe, may be used to alter the attributes of a user's avatar, virtual home, or virtual landscape. The biometric or related user attributes may have safety and health implications. For example, if a user in the real world is having health problems and does not often leave the user's real home, these attributes in the virtual world may alert lay people and health professionals in the virtual universe as to possible health or safety concerns. Also, the transmission of financial attributes of a user into a virtual universe, such as may be used to alter the attributes of a user's avatar, virtual home, or virtual landscape, may have business implications and facilitate business transactions. For example, if a user is determined to be wealthy or, on the other hand, has poor credit in the real world, these attributes may alert lay people and business professionals in the virtual universe as to possible concerns or lack of concerns.

While the invention has been described in terms of embodiments, those skilled in the art will recognize that the invention can be practiced with modifications and in the spirit and scope of the appended claims. Additionally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A system comprising:
   a processor;
   a collection engine configured to collect one or more inputs;
   at least one rule set defined by a user regarding characteristics of the user in a virtual universe;
   an emotion engine configured to accept the one or more inputs and operate on the at least one rule set by comparing the one or more inputs to the at least one rule set, the emotion engine configured to modify at least one characteristic of a user's mood when the comparing produces a match; and
   a feedback engine configured to provide feedback to the user based on the comparing, wherein the feedback is separate from the modified at least one characteristic,
   wherein the feedback includes a prompt for a subsequent action to occur based on a user's determined mood as determined by the emotion engine, the subsequent action being configured to alter the user's determined mood to be different than that modified by the emotion engine,
   wherein the collection engine, the emotion engine, and the feedback engine operate using the processor,
   wherein the prompt is provided from a policy table which determines an amount and type of the feedback, wherein the one or more inputs are aggregated from a plurality of users to determine an aggregate mood for the plurality of users, and wherein the determined aggregate mood of the plurality of users is reflected in characteristics of a building associated with the plurality of users.

2. The system of claim 1, wherein the policy table comprises one or more audio and/or visual modifications, which are configured to alter an inferred mood.

3. The system of claim 1, wherein the at least one rule set comprises at least one of a rule name, rule number, condition test, condition priority, characteristic action, characteristic duration or the at least one characteristic.

4. The system of claim 1, wherein the one or more inputs are obtained from at least one of an analysis agent, financial transaction agent, medical and/or prescription agent, environmental sensor, calendar agent, profile information, physiological agent, or biometric agent.

5. The system of claim 1, further comprising an override configured to prevent the at least one characteristic from being modified and a filter to prevent at least one of the one or more inputs from being sent to the emotion engine.

6. The system of claim 1, wherein the at least one characteristic is associated with one or more of an avatar, a landscape, a map, and a building.

7. The system of claim 1, wherein the policy table comprises one or more audio and/or visual modifications, which are configured to alter an inferred mood, wherein the at least one rule set comprises at least one of a rule name, rule number, condition test, condition priority, characteristic action, characteristic duration or the at least one characteristic, wherein the one or more inputs are obtained from at least one of an analysis agent, financial transaction agent, medical and/or prescription agent, environmental sensor, calendar agent, profile information, physiological agent, or biometric agent, wherein the at least one characteristic is associated with one or more of an avatar, a landscape, a map, and a building, and wherein a filter is provided to prevent at least one of the one or more inputs from being sent to the emotion engine.

8. The system of claim 1, wherein:
the feedback is provided to the user before the modifying the at least one characteristic;
the feedback is presented to the user visually, audibly, and/or textually separate from the modified at least one characteristic; and
the feedback indicates at least one of a detected mood and an attempt to alter the user's mood; and
the user is permitted to override a suggested modification of an avatar of the user after the feedback is provided and prior to the modifying the at least one characteristic.

9. The system of claim 8, wherein:
the policy table comprises one or more audio and/or visual modifications, which are configured to alter an inferred mood,
the at least one rule set comprises at least one of a rule name, rule number, condition test, condition priority, characteristic action, characteristic duration or the at least one characteristic,
the one or more inputs are obtained from at least one of an analysis agent, financial transaction agent, medical and/or prescription agent, environmental sensor, calendar agent, profile information, physiological agent, or biometric agent,
the at least one characteristic is associated with one or more of an avatar, a landscape, a map, and a building, wherein a filter is provided to prevent at least one of the one or more inputs from being sent to the emotion engine,
the aggregate mood for the plurality of users participating in the virtual universe is computed using the processor;
the aggregate mood for the plurality of users is displayed to the user via a visual or numerical scale; and
the aggregate mood of the plurality of users is reflected in a characteristic of a physical object within the virtual universe.

10. A method implemented on a computer infrastructure for modify characteristics comprising:
ascertaining one or more inputs of an avatar in a virtual universe;
comparing the one or more inputs to at least one rule set which comprises at least one characteristic, wherein the rule set is defined by a user regarding characteristics of the avatar in the virtual universe;
applying a priority to the at least one characteristic, wherein the priority controls durations and actions associated with the avatar in the virtual universe;
modifying the at least one characteristic regarding an avatar's mood based on the priority; and
providing feedback to the user in the virtual universe based on the comparing step, wherein the feedback is separate from the modified at least one characteristic, and the feedback includes a prompt for a subsequent action to occur based on an avatar's determined mood from the comparing, wherein the subsequent action is configured to alter the avatar's determined mood to be different than that modified based on the priority,
wherein the prompt is provided from a policy table which determines an amount and type of the feedback,
wherein the one or more inputs are aggregated from a plurality of users to determine an aggregate mood for the plurality of users, and
wherein the determined aggregate mood of the plurality of users is reflected in characteristics of a building or a landscape associated with the avatar and the plurality of users.

11. The method of claim 10, wherein the modifying step is performed when the comparing step produces a match between the one or more inputs and the at least one rule set.

12. The method of claim 10, wherein the at least one characteristic includes one or more of hair color, skin color, height, weight, build, emotion, facial expression, voice, clothing, stature, and body movements.

13. The method of claim 10, further comprising controlling the at least one avatar characteristic through an Application Program Interface.

14. The method of claim 10, further comprising displaying a modified characteristic to one or more avatars within a virtual universe.

15. The method of claim 10, further comprising:
ascertaining the one or more inputs from at least one of a text analysis agent, financial transaction agent, medical and/or prescription agent, environmental sensor, calendar agent, profile information, physiological agent, or biometric agent;
comparing the one or more inputs to the at least one rule set via an emotion engine, wherein the rule set comprises at least one of a rule name, rule number, condition test, condition priority, or the at least one characteristic;
allowing the user to override a modification from the modifying step before or after the modification is applied; and displaying a modified characteristic to one more avatars within a virtual universe.

16. The method of claim 10, wherein the steps of claim 10 are offered by a service provider based on one of a fee and subscription basis.

17. The method of claim 10, wherein the steps of claim 10 are provided on a computer infrastructure, which is one of supported, deployed, maintained, and created by a service provider.

18. The method of claim 10, wherein the steps of claim 10 are implemented on a combination of software and hardware, or hardware.

19. A computer program product comprising a tangible computer usable storage medium having readable program code embodied in the tangible non-transitory storage medium, the computer program product includes at least one component operable to:

obtain one or more inputs;

compare the one or more inputs to at least one rule set defined by a user regarding characteristics of the user in a virtual universe to determine an applicability of the at least one rule set, wherein the comparison is performed by an emotion engine;

modify at least one characteristic of a user's mood based on the comparison;

display the modified at least one characteristic in the virtual universe; and provide feedback to the user in the virtual universe based on the comparing step, wherein the feedback is separate from the modified at least one characteristic, and wherein the feedback includes a prompt for a subsequent action to occur based on a user's determined mood based on the comparison, wherein the subsequent action is configured to alter the user's determined mood to be different than the modification of the user's mood based on the comparison, wherein the prompt is provided from a policy table which determines an amount and type of the feedback, wherein the one or more inputs are aggregated from a plurality of users to determine an aggregate mood for the plurality of users, and wherein the determined aggregate mood of the plurality of users is reflected in characteristics of a building associated with the plurality of users.

20. The computer program product of claim 19, wherein the computer program product is further operable to provide the feedback to the user before the display and is further operable to permit the user to override at least one of the modification and the display.

21. The computer program product of claim 19, wherein the computer program product is at least one of supported, deployed, maintained, and created by a service provider.

22. The computer program product of claim 19, wherein the computer program product is further operable to:

ascertain the one or more inputs from at least one of a text analysis agent, financial transaction agent, medical and/or prescription agent, environmental sensor, calendar agent, profile information, physiological agent, or biometric agent;

compare the one or more inputs to at least one rule set, wherein the rule set comprises at least one of a rule name, rule number, condition test, condition priority, or the at least one characteristic;

provide feedback to a user based on the comparison, wherein the feedback is determined from a policy table;

allow the user to override a modification before or after the modification is applied; and display a modified characteristic to one more avatars within a virtual universe.

23. A method for deploying an application for modifying audio communications, comprising:

providing a computer infrastructure being operable to:

collect information about an avatar associated with a user of a virtual universe;

filter a first portion of the information using parameters specified by the user and maintained in a policy table;

after the filtering, compare an unfiltered, second portion of the information to at least one rule set defined by the user regarding characteristics of the user in the virtual universe;

provide feedback to the user, based on the comparing, indicating at least one of a detected mood and an attempt to alter the user's mood;

permit the user to override a suggested modification of the avatar regarding a mood of the avatar after providing the feedback based upon a prompt in the feedback allowing the user to override the suggested modification to the avatar's mood;

modify at least one characteristic of the avatar based on the comparison and when the suggested modification has not been overridden after the providing the feedback; and display the avatar having the modified at least one characteristic in the virtual universe, wherein the prompt is provided from the policy table, and the policy table determines an amount and type of the feedback, wherein the one or more inputs are aggregated from a plurality of users to determine an aggregate mood for the plurality of users, and wherein the determined aggregate mood of the plurality of users is reflected in characteristics of a building associated with the avatar and with the plurality of users.

24. The method of claim 23, wherein the at least one avatar characteristic includes one or more of hair color, skin color, height, weight, build, emotion, facial expression, voice, clothing, stature, and body movements.

25. The method of claim 23, wherein the one or more inputs are from one or more of a text analysis agent, financial transaction agent, medical and/or prescription agent, environmental sensor, calendar agent, profile information, physiological agent, or biometric agent.

26. The method of claim 23, wherein the computer infrastructure is at least one of supported, deployed, maintained, and created by a service provider.

* * * * *